Patented Dec. 22, 1925.

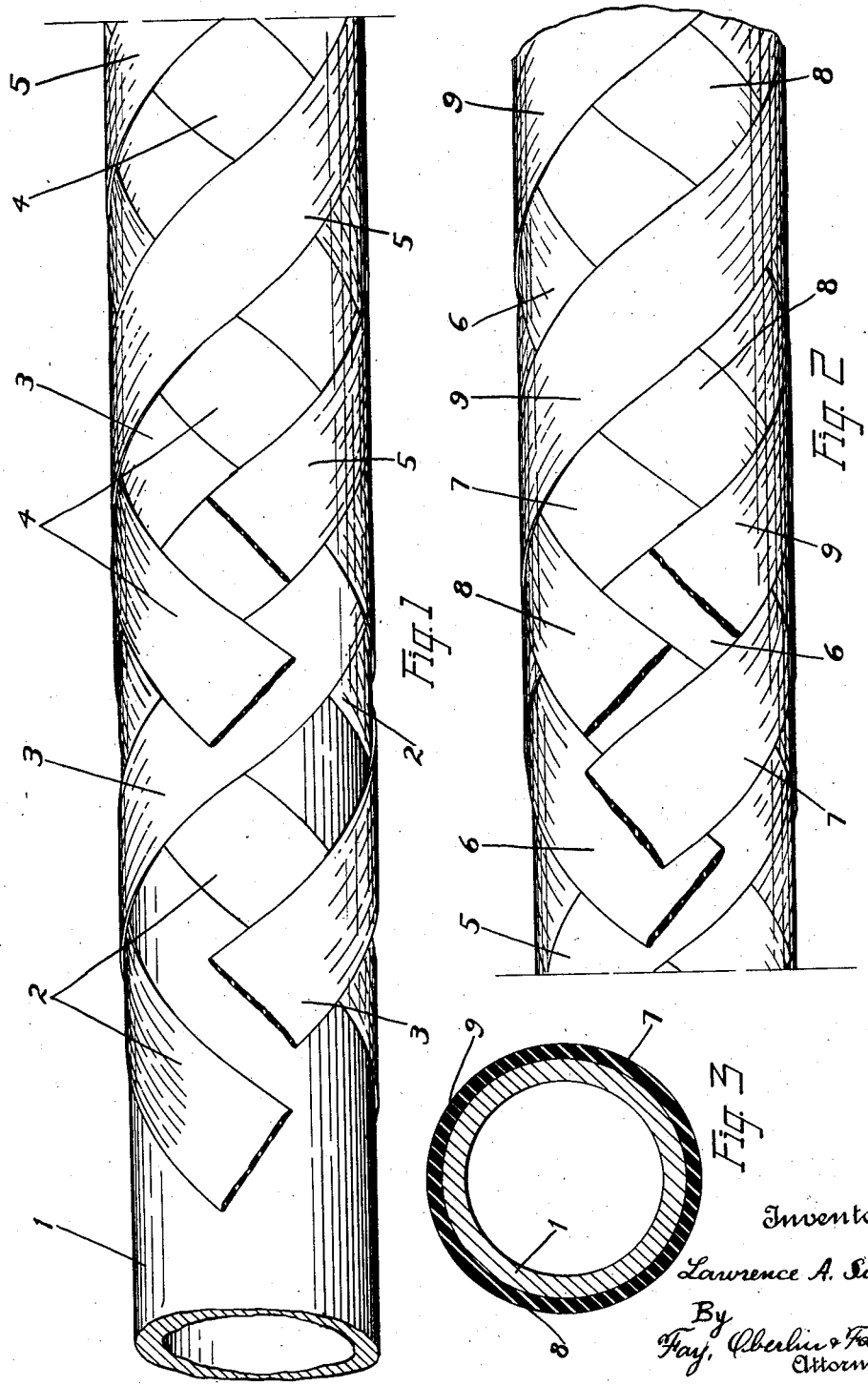

1,566,512

UNITED STATES PATENT OFFICE.

LAWRENCE A. SUBERS, OF LAKEWOOD, OHIO.

LAMINATED COHESIVE INTERWOUND RUBBER TUBE AND METHOD OF MAKING THE SAME.

Application filed May 18, 1921. Serial No. 470,646.

*To all whom it may concern:*

Be it known that I, LAWRENCE A. SUBERS, a citizen of the United States, and a resident of Lakewood, county of Cuyahoga, and State of Ohio, have invented a new and useful Improvement in Laminated Cohesive Interwound Rubber Tubes and Methods of Making the Same, of which the following is a specification, the principle of the invention being herein explained and the best mode in which I have contemplated applying that principle, so as to distinguish it from other inventions.

The present invention relates to a type of rubber tube in which the wall or body is composed of bands of unvulcanized, calendered rubber or rubber composition without fabric or fibrous material, interwound about a mandrel in successive series and similar in construction to fabric tubes as shown in my United States Letters Patent No. 1,011,090 and No. 1,024,915.

At present there are two types of rubber tubes that are generally used and made. First, the extruded or squirted tubing, and secondly, the tube made of calendered rubber which is put together with a longitudinal seam or lap. In extruded or squirted tubing the body or wall is not as dense or compact as a tube made of calendered rubber and therefore is not as impervious or as satisfactory tube for high pressures. In the squirted tubing the elasticity seems to be about equal in all directions but in the calendered tube the stretch is less lengthwise of the tube than it is at right angles. This is because calendered rubber has a distinct lengthwise fiber which is given to it during the calendering process and this lengthwise fiber of the rubber increases the strength lengthwise or decreases the strength across the fiber and thus a tube made of calendered fiber tends to split between the grain or fiber of the rubber under pressure.

In the present invention a balanced tube of calendered rubber is possible, since the angle of winding of the series of bands in the different layers controls the action of the tube when under stress.

It has been shown by repeated experiments that by laminating and interwinding bands of material at an angle of approximately 52° to the longitudinal axis of the tube a practically balanced condition of diametral expansion and longitudinal elongation has been obtained.

The annexed drawings and the following description set forth in detail one method and one product exemplifying my invention, such disclosed procedure and product constituting, however, but one of various applications of the principle of my invention.

In said annexed drawings, Fig. 1 is a side view of a mandrel, showing the method of interwinding the rubber bands which comprise the tube; Fig. 2 is a continuation of Fig. 1 showing the further construction of the tube; Fig. 3 is a cross section of Fig. 2.

In the construction of this tube a cylindrical mandrel 1 is employed about which are wound bands 2 of calendered rubber without fabric or fibrous material, so cut that the grain of the rubber is lengthwise of the strip. These bands are wound spirally around the mandrel at an angle of about 52° to the longitudinal axis thereof, spaced 180° circumferentially apart, and of such width that one-half the surface of the mandrel is covered thereby.

Next two bands 3 similar to bands 2 and of calendered rubber without fabric or fibrous material, are wound spirally about the mandrel in the opposite direction over and around the bands 2, also spaced circumferentially 180° apart, at an angle of 52° to the longitudinal axis of the tube, and of the same width as bands 2.

Continuing the process two similar bands 4 are wound over and around bands 3, in the same direction as bands 2, and of the same width, being laid over and covering the spaces between bands 2, thus being also spaced 180° circumferentially apart.

In a similar way bands 5 are then wound over and around bands 4 in the same direction and angle as bands 3 and over and covering the spaces between them, thus being spaced 180° circumferentially apart, and completing one layer of bands.

This layer of bands is then rolled into a compact form by rolls revolving around the mandrel, or other suitable means, and thus presents a smooth surface for the construction of a second layer of bands thereupon, if this is found desirable although one complete set of four bands completes a tube. The angle of 52° at which the bands are wound about the mandrel has proven the best for balancing the stresses longitudinally and circumferentially due to internal pressure.

Another complete layer of rubber or tube may be constructed in a similar manner with bands 6, 7, 8, and 9, the angle of winding being practically 52° to the longitudinal axis, but the bands being of increased width over those of the first layer, in order to completely cover the increased surface due to the increased diameter. Being laid over this increased diameter at this same angle as the bands of the first layer it is clearly evident that an increased lead is required to maintain the band length the same per unit length of tube. By lead is meant the center distance apart, parallel to the axis, of one complete spiral turn about the mandrel.

It is thus evident that by winding the bands of increased width at the same angle in the second layer that their length is the same as those of the first layer, and that under longitudinal stress the combined strength of all the bands are available for resisting rupture.

The second layer bands are rolled down as previously described and the tube may be used as the inner lining of a hose constructed as per my United States Letters Patent No. 1,011,090 and No. 1,024,915, or it may be wrapped and vulcanized or cured in any suitable way if it is to be used as finished product in itself as for instance an inner tube for a tire. In the latter case, the ends of the tube when removed from the mandrel have to be joined together as in the present method of inner tube manufacture.

It has been shown that calendering sheet rubber gives a distinct lengthwise fibre or grain to the rubber and greater strength lengthwise than sidewise. Thus by interwinding calendered strips of sheet rubber at an angle of approximately 52° to the longitudinal axis of the tube, the lengthwise strength of the calendered strips is gained and distributed practically equally in resisting diametral and longitudinal stress. This means that a stress tending to split the tube lengthwise would exert a diagonal stress across the bands at an angle of approximately 38°.

When preparing bands for the construction of a single layer tube, for example, wherein the thickness of the finished tube is ⅛", the bands are one-half of this thickness or 1/16", and cut at the width that is necessary to cover the mandrel, although eight bands are laid to make a single layer tube, the thickness of the finished tube would be ⅛" or twice the thickness of the band. In a double layer tube the thickness of the wall is equal to approximately four times the thickness of a band.

It is obvious that a tube of one or any number of layers may be constructed according to the purpose desired without departing from the spirit of the invention or the scope of the claims.

It is also evident that this tube may be constructed over and around the body of a hose and thus form the cover thereof without departing from the spirit of the invention or the scope of the claims, or that it may be used as the rubber inner liner of a hose and have the fabric body of the hose formed directly thereon.

The tube of calendered strips which are entirely free from any fabric is then vulcanized or cured by any suitable process into a single homogeneous rubber tube which is of balanced construction giving increased strength and yet maintaining the advantages gained by using calendered instead of extruded or squirted rubber.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. The method of forming a flexible resilient tube of balanced resistance to pressure, consisting of forming a layer of rubber by winding a series of bands of calendered rubber free of fabric about a mandrel, the bands of each series being the same length per unit length of tube, and being wound at a predetermined angle to the longitudinal axis of the tube, the bands of each successive series being wound in the opposite direction, the bands of each series being spaced apart a distance equal to their own width so as to cover one half of the surface of the mandrel, and then vulcanizing the same to form a homogeneous structure of rubber.

2. A flexible resilient tube consisting of a plurality of layers of bands of pure rubber, each layer consisting of a series of laminated cohesive interwound bands of rubber of predetermined width wound at an angle to the longitudinal axis of the tube and spaced apart a distance equal to their width, each successive series being wound in the opposite direction, the bands of each series being of the same length per unit length of tube, the whole series being vulcanized into a homogeneous tubular structure.

3. The method of forming a flexible resilient tube of balanced resistance to pressure, consisting of forming a layer of rubber by winding four series of bands of calendered rubber free of fabric about a mandrel, the bands of the first and third series being wound in one direction and the bands of the second and fourth series being wound in the opposite direction, the bands of each series covering one-half of the mandrel and thus forming a layer two bands thick at all points, and then curing the formed tube to make a homogeneous rubber tube.

Signed by me this 12th day of May, 1921.

LAWRENCE A. SUBERS.